United States Patent [19]
Botta, Jr. et al.

[11] 3,881,544
[45] May 6, 1975

[54] MOLD OSCILLATING APPARATUS

[75] Inventors: Jose A. Botta, Jr., Pittsburgh; Dale K. Beachy, Finleyville, both of Pa.

[73] Assignee: Koppers Company, Inc., Pittsburgh, Pa.

[22] Filed: Jan. 11, 1974

[21] Appl. No.: 432,766

[52] U.S. Cl. .............................. 164/260; 164/83
[51] Int. Cl. ........................................ B22d 27/08
[58] Field of Search .................. 164/260, 283, 83

[56] References Cited
UNITED STATES PATENTS
3,638,714   2/1972   Newhall ............................. 164/260

Primary Examiner—Francis S. Husar
Assistant Examiner—John S. Brown
Attorney, Agent, or Firm—Sherman H. Barber; Olin E. Williams; Oscar B. Brumback

[57] ABSTRACT

A mold supported on a mold table is reciprocated by a power unit, and guide rollers coact with an arcuate edge of a guide as pins coact with elongate slots in a mold table whereby the mold oscillates along an arc as a cast strand is withdrawn from the mold.

4 Claims, 2 Drawing Figures

MOLD OSCILLATING APPARATUS

BRIEF SUMMARY OF THE INVENTION

A mold oscillating apparatus includes means supporting a mold table carrying a mold. The means comprises a pair of opposed pins mounted to the mold table that engage adjacent supporting structure; a roller mounted to the mold table coacts with a fixed arcuate guide; and powered means for moving the mold table upwardly and downwardly whereby the mold table and mold move along an arcuate path.

For a further understanding of the invention and for features and advantages thereof, reference may be made to the following description and the drawing which illustrates a preferred embodiment of equipment in accordance with the invention.

DETAILED DESCRIPTION

Figure 1:
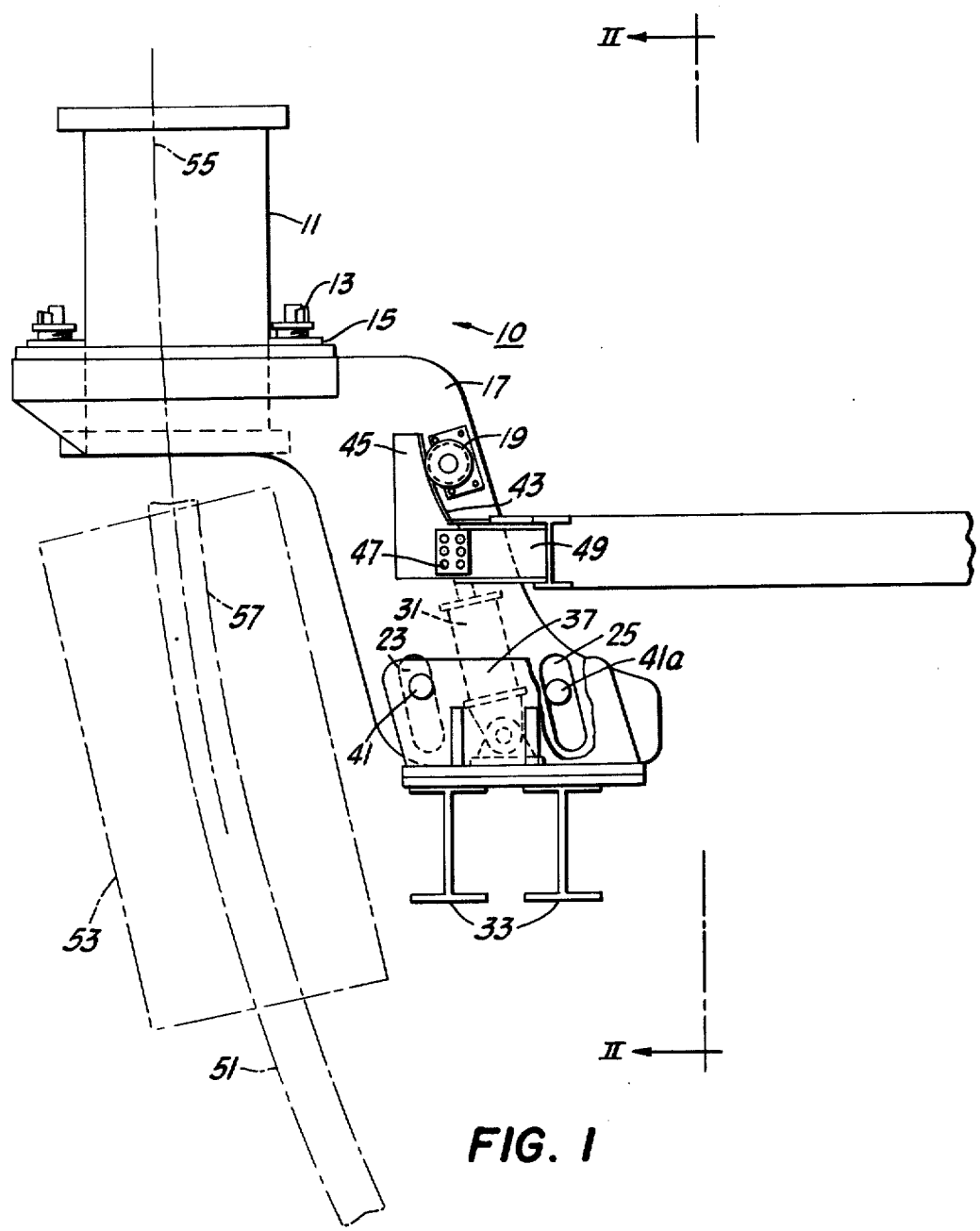
FIG. 1 is a schematic side elevational view of apparatus in accordance with the invention.
Figure 2:
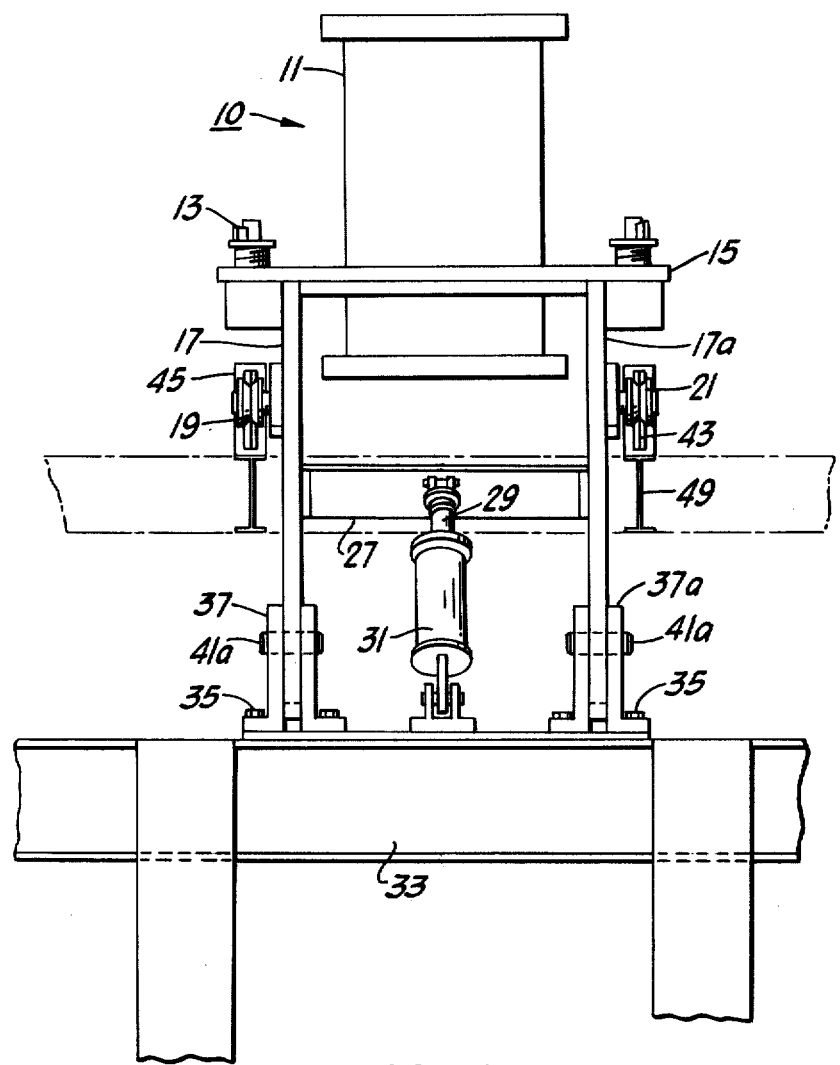
FIG. 2 is a view along line II—II of FIG. 1.

In FIG. 1, a mold oscillating apparatus 10 includes a continuous casting mold 11, shown being supported and secured by fasteners 13 to a mold table 15. The mold table is fitted with two large parallel, spaced-apart plate brackets 17, 17a, which have a shape about as shown. Each bracket 17, 17a is provided with a grooved roller 19, 21 that is journaled thereto about where shown. Each bracket 17, 17a also has a pair of elongate apertures 23, 25 that are generally parallel and that are located and oriented about as shown in FIG. 1.

Between the brackets 17, 17a there is disposed an intercostal beam 27 that connects to each bracket and to the end of a piston rod 29 of a cylinder-piston assembly 31. The cylinder-piston assembly is secured to cross beams 33 on which are mounted, as by fasteners 35, pairs of brackets 37, 37a, and 39, 39a.

Each pair of brackets 37, 37a and 39, 39a support pins 41, 41a that pass through the elongate apertures 23, 25; the pins 41, 41a being slightly smaller in diameter than the width of the elongate apertures 23, 25. The pins 41 contact one side of the elongate aperture 23, as shnown, while the pins 41a contact the opposite side of the aperture 25, as shown in FIG. 1. In a modification of the present invention, the pins 41, 41a may support rollers (not shown) that would coact with the sides of the apertures 23, 25, if such rollers are used.

The grooved rollers 19 coact with the arcuate beveled edge 43 of a removable and replaceable guide 45 that is bolted, as at 47, to a supporting beam structure 49 located adjacent the plate brackets 17, 17a.

In operation, as molten metal is teemed from a tundish (not shown) into the mold 11, and as a continuous cast strand 51 is withdrawn therefrom, which strand 51 is cooled conventionally in a spray box 53, the mold 11 is oscillated by actuating the fluid-actuated, cylinder-piston assembly 31.

The brackets 17, 17a, which are connected to the piston rod 29 of the cylinder-piston assembly 31, reciprocate upwardly and downwardly, and the grooved guide roller 19 follows the arcuate, beveled edge of the guide 45. The pins 41, 41a being fixed, do not move, but they remain in contact with the respective sides of the elongate apertures 23, 25, as shown in FIG. 1. Whereby, the mold 11 oscillates along an arc 55, which is an extention of the longitudinal centerline axis 57 of the cast strand 51.

In a modification of the invention, the power unit for reciprocating the brackets and mold may be a motor-driven eccentric (not shown), or any other suitable powered device that can move the mold and support structure upwardly and downwardly.

From the foregoing description of the one embodiment of the invention, those skilled in the art should recognize many important features and advantages of it, among which the following are particularly significant:

That the mold oscillating drive system is located toward the center of curvature of the strand, and not in a direct line with molten metal as it teems into the mold. Wherefore, any spillage of molten metal does not fall upon and thereby damage the mold oscillating system;

That the mold oscillating system is simple to construct and is easy to maintain and service; and That the mold oscillating system is much less costly than conventional units as known from the prior art.

Although the invention has been described herein with a certain degree of particularity it is understood that the present disclosure has been made only as an example and that the scope of the invention is defined by what is hereinafter claimed.

What is claimed is:

1. Apparatus for oscillating a vertical flow-through continuous casting mold comprising:
   a. a mold table supporting said mold;
   b. means supporting said mold table;
   c. a pair of members fixed adjacent and coacting with said means supporting the mold table in such a way that said means moves along a preselected path;
   d. a roller mounted to said means supporting the mold table and movable therewith;
   e. an arcuate guide fixed adjacent to and coacting with said roller; and
   f. powered means engaging the mold table supporting means for moving said supporting means upwardly and downwardly whereby as said roller coacts with said arcuate guide and as said fixed members coact with the supporting means, said mold oscillates along an arcuate path.

2. The invention of claim 1 wherein:
   a. said fixed members are pins that engage the sides of elongate apertures in said mold table.

3. Apparatus for oscillating a vertical flow-through continuous casting mold comprising:
   a. a mold table supporting a mold;
   b. a pair of spaced-apart parallel brackets secured to said mold table;
   c. a support member mounted adjacent each said bracket and carrying a pin that engages the sides of elongate apertures in the respective adjacent bracket;
   d. a roller mounted to each said bracket and cooperating with a curved guide member fixed in position relative to each bracket; and
   e. powered means engaging said brackets that move them and said mold upwardly and downwardly whereby as said pins coact with the sides of said apertures and said roller the curved guide, said mold reciprocates along and arcuate path.

4. The invention of claim 3 wherein:
   a. said powered means includes a fluid-actuated cylinder-piston assembly.

* * * * *